United States Patent [19]

Schmidtchen

[11] 4,333,898
[45] Jun. 8, 1982

[54] METHOD OF MAKING A FOAMED PLASTIC

[75] Inventor: Hans-Martin Schmidtchen, Osnabrück, Fed. Rep. of Germany

[73] Assignee: Kabel und Metallwerke Gutehoffnungshutte A.G., Hanover, Fed. Rep. of Germany

[21] Appl. No.: 955,101

[22] Filed: Oct. 26, 1978

[30] Foreign Application Priority Data

Mar. 25, 1977 [DE] Fed. Rep. of Germany ....... 2713181

[51] Int. Cl.³ .............................................. B29D 7/02
[52] U.S. Cl. .................................... 264/45.9; 264/50;
264/DIG. 18; 521/79; 521/81; 521/82;
521/134; 521/143; 521/154
[58] Field of Search ................ 521/82, 143, 154, 79,
521/81, 134

[56] References Cited

U.S. PATENT DOCUMENTS

| | | | |
|---|---|---|---|
| 2,948,665 | 8/1960 | Rubens et al. | 521/143 |
| 2,960,482 | 11/1960 | Henning | 521/143 |
| 3,017,371 | 1/1962 | Hohenberg et al. | 521/143 |

FOREIGN PATENT DOCUMENTS 1234034 6/1971 United Kingdom .
1286460 8/1972 United Kingdom .
1408154 10/1975 United Kingdom .

*Primary Examiner*—Morton Foelak
*Attorney, Agent, or Firm*—Ralf H. Siegemund

[57] ABSTRACT

An elastomeric or thermoplastic polymer, such as polyethylene, is mixed with silane for grafting onto the polyethylene; after grafting the material is extruded around a cable, a conductor, tubing or the like, but just prior to extrusion moist nitrogen is forced into the extruder so that the material will expand to foam, the cells being filled with moist gas so that the cell walls crosslink to stabilize the resulting foam sheath.

9 Claims, 1 Drawing Figure

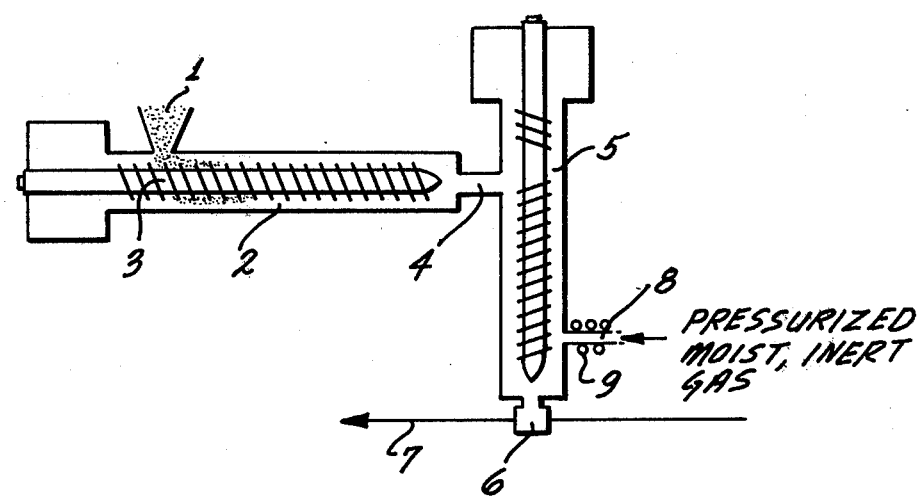

METHOD OF MAKING A FOAMED PLASTIC

BACKGROUND OF THE INVENTION

The present invention relates to the production of a cellular or foamed polymeric material, and more particularly, the invention relates to a method of production of a cellular thermoplastic polymeric material such as an olefin polymer or copolymer, or a cellular elastomer or a thermoplastic rubber, which material, after the grafting on of a silane compound, may crosslink in the presence of moisture. The cellular material may, for example, be utilized to form a coating or sheath on a linearly extended substrate member, for instance an electric cable, lead or conductor, or a tube.

Processes are already known for the production of materials which crosslink in the presence of moisture. As a preparatory step, silane is first being grafted onto the molecules of a polymeric base or host material and subsequently the material is exposed to moisture to obtain crosslinking (see, for example, German printed patent applications Nos. 1,794,028 and 2,439,513, as well as U.S. Pat. Nos. 3,646,155 and 4,058,583). It is also known to expand material for purposes of obtaining foam prior to crosslinking in the presence of water, in that an expanding or blowing agent has been added to the raw material (see German printed patent application No. 23 10 040). The expanding or blowing agent is activated by heat, releasing a gas, e.g. nitrogen or carbon dioxide, which produces cells in the material. This known method is disadvantaged, however, in that the expanding agent, e.g. azodicarboxylamide (azodicarbonamide), dinitrosopentamethylenetetramine, sodium bicarbonate or ammonium carbonate, or a decomposition product thereof, will normally remain in the material and may, for example, produce an appreciable modification in its electrical properties. This means that for certain purposes the cellular material is rendered unsuitable.

DESCRIPTION OF THE INVENTION

It is an object of the present invention to provide a new and improved method for producing a cellular polymeric material which has mechanically stable cells and which can also meet certain stringent requirements with respect to the electrical properties, e.g. loss factor and dielectric constant, which are important in cable technology.

According to the present invention, it is suggested to provide a cellular thermoplastic or elastomeric material upon which a silane compound is grafted. Subsequently, a moist gas is introduced into the polymeric material while it is in a fluid state, and the material is immediately thereafter shaped into the final product. The gas causes the material to foam and the moisture included in the gas causes the material of the resulting cell walls to crosslink. Expanding agents or decomposition products thereof are not left in the material in this process. The moisture introduced with the expanding gas easily suffices, at least to stabilize the cell walls produced during the expansion of the material, that is to say that the moisture as so introduced causes the crosslinking to proceed far enough to ensure that during further processing the expanded material will have adequate stability.

We are aware that a "gas injection" cell-forming technique has been proposed in German printed patent application No. 24 37 998, but this prior technique calls for additional crosslinking agents, that is to say the cell formation and the crosslinking are actually distinct steps. In contrast with this, the moist gas used in the process of the invention is employed directly to form cells and at the same time, acts as a carrier of a reactant which brings about crosslinking, namely the water. The present invention has the further advantage over the prior "gas injection" technique in that the "reactant" (water) is introduced in a finely distributed form, and rendered available immediately where it is required, namely in the cellular material, because the cells are formed by the gas carrier of the reactant.

The cellular material which we obtain is sufficiently stable in structure for any normal further processing and can be used for any of the usual purposes, e.g. for the production of coaxial telecommunication cables or for the production of tubing having thermal and sound insulation. The particular advantages of the present process can be appreciated fully in cases in which an elongated substrate member has to be covered around its entire circumference as it passes through a sheath applying station.

The moist gas employed in the present process normally comprises a mixture of water vapor and an inert gas. An "inert gas" in accordance with the present specification, is a gas which does not enter into a chemical reaction with the specific polymeric material used or with any additive or other ingredient used in a process according to the invention. In other words, inert is not necessarily as broadly restrictive as it is generally understood. Thus, it may comprise, but does not necessarily comprise, an element of Group 0 of the Periodic Classification of the Chemical Elements according to Mendeléeff. Preferably, however, the inert gas is nitrogen, argon, helium or carbon dioxide. Of these, nitrogen is particularly preferred as an inert carrier and blowing gas. The use of an inert gas ensures that undesirable side reactions which might interfere with the continuity of production can be avoided.

The introduction of moisture into the fluid polymeric material requires the water to be finely dispersed in order to bring about the desirable effect, namely crosslinking of the walls of cells just formed. If the concentration of moisture which can be introduced by means of a carrier gas at room temperature, is not sufficient, then the moist gas should be introduced at a temperature above room temperature, whereby the fine distribution of the water is maintained but the water carrying capacity of the gas is increased. The degree of crosslinking, or at least the extent of initial crosslinking can be controlled through this adjustment of the moisture concentration. Specifically, one must introduce sufficient moisture so that the cell walls crosslink at least up to a point in which they can be regarded as being stabilized. Naturally, it is advisable to keep the concentration of water below saturation in the carrier gas as otherwise the intended result, i.e. a fine distribution of the moisture during cell formation, may not be attainable.

Advantageously, the temperature of the moist gas will be high enough to permit, for example, 1 to 2% of moisture to be introduced into the polymeric material which is in a fluid condition. A proportion of 1 to 2% of moisture will usually produce a degree of crosslinking which is sufficient to provide at least temporary or preliminary stability to the resulting product. Subsequent exposure of the product to moisture, and/or internal release of water will complete the crosslinking as is conventional.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a diagrammatic sectional view of an apparatus comprising two single-screw cascaded extruders.

In the process according to the invention to which the FIGURE relates, a granular polymeric starting material, for example, polyethylene granules, are combined with a silane and other additives (as required) dissolved in the silane. The proportions are metered into a hopper 1 of an extruder 2 feeding a second extruder 5. The arrangement resembles in that respect the arrangement in U.S. Pat. No. 4,117,063. Also, the same materials can be used.

The granulate is being wetted by the silane solution on contact in extruder 2. The constituents are vigorously mixed as a rotating screw 3 advances the method and renders it fluid. Also, the temperature of the mixture increases to that the silane is grafted onto the polyethylene as the mixture moves forward in the extruder. The grafted material is fed through a connecting passage 4 to a second extruder 5 which constitutes the discharge extruder of the apparatus illustrated. The material is applied by an extrusion head 6 of this extruder 5 to an advancing linearly extended member substrate or elongated stock 7 which may, for example, be an electric cable, lead or conductor, or a metal tube.

To ensure that grafted material will surround the member 7 in a cellular condition and on all sides and over its entire length, a moist gas under pressure is introduced through an inlet 8 of the extruder 5. This inlet may, for example, be comprised of a small, bored nozzle, and should preferably be disposed in the vicinity of the point of maximum pressure within the discharge extruder 5. In the case of a 150/15 D extruder, therefore, it is desirable to position the inlet 8 at 5-10 D. By this means it is possible, for example, to expand a polyethylene melt with the aid of moist nitrogen at a pressure of up to 220 bars. This pressure is in excess of the extruder pressure. The temperature of the gas can be regulated by a pre-heating device 9. As stated above, increasing the temperature of the gas increases the capacity of the gas to carry moisture. By way of example, a concentration of 1 to 2% water in the carrier gas suffices to produce subsequently a sufficient degree of crosslinking of the cell wall material so that they are stabilized.

The pressure of the melt in the extruder drops as the melt leaves the extrusion head 6, and now the gas introduced through the inlet 8 expands so that the melt develops the desired cellular structure. At the same time, or immediately before this expansion, according to the material's residence time, the shortness of which has to be borne in mind, crosslinking begins. The crosslinking is made possible by the presence of the water in the moist gas that now fills the cells. As the cell walls crosslink, the foam is mechanically stabilized. Crosslinking of the foam, in turn, permits expansion to a high degree of cellularity, without loss in mechanical strength.

The method of mixing the polymeric starting material with the additives therefor, and the method of grafting, can be modified in certain respects, the important feature being the introduction of a moist gas which serves at one and the same time as an expanding agent and as a carrier of one of the reactants for the siloxane crosslinking reactant.

The invention is not limited to the embodiments described above but all changes and modifications thereof not constituting departures from the spirit and scope of the invention are intended to be included.

I claim:

1. In a method of making a cellular, polymeric product, wherein a silane compound is grafted upon a thermoplastic or elastomeric material to permit crosslinking in the presence of moisture, after the grafting-on of the silane, the grafted material being in a fluid state, the improvement of introducing into the grafted material from the outside pressurized, moist gas as a foaming agent, subsequent to grafting, while the grafted material is still in the fluid state, for obtaining and producing cells in the material, the cell walls being exposed to the moisture in the gas and begin crosslinking, and immediately thereafter shaping the material into the desired product.

2. Method in accordance with claim 1, wherein the polymeric material comprises an olefin polymer or copolymer, or an elastomer or a thermoplastic rubber.

3. Method in accordance with claim 1 or 2, wherein the shaping step comprises extruding a coating or sheath around elongated stock such as an electric cable, lead or conductor, or a tube, the moist gas being introduced into an extruder at an excess pressure.

4. Method in accordance with claim 1, or 2, wherein the moist gas is comprised of a mixture of water vapor and of an inert gas.

5. Method in accordance with claim 4, said inert gas being nitrogen.

6. Method in accordance with claim 1, and including heating the moist gas to a temperature above room temperature prior to said introducing.

7. In a method of coating elongated stock, by means of a cross-linked foam of thermoplastic or elastomeric material, wherein a silane compound has been grafted upon the material, and wherein subsequently the material is extruded onto and around the stock, the improvement of introducing a pressurized, moist gas into the material just prior to extrusion for expanding the material in order to obtain cells and for beginning cross-linking of the cell walls by exposure to the moisture of the blowing gas.

8. Method in accordance with claim 6 or 7, wherein the moist gas is comprised of a mixture of water vapor and of an inert gas.

9. Method in accordance with claim 8, said inert gas being nitrogen.

* * * * *